(12) United States Patent
Domi et al.

(10) Patent No.: US 6,733,850 B1
(45) Date of Patent: May 11, 2004

(54) GLASS PANEL AND PRODUCTION METHOD THEREFOR

(75) Inventors: Shinjiro Domi, Osaka (JP); Koichi Sakaguchi, Osaka (JP); Masao Misonou, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 287 days.

(21) Appl. No.: 09/869,090

(22) PCT Filed: Oct. 19, 2000

(86) PCT No.: PCT/JP00/07304

§ 371 (c)(1), (2), (4) Date: Jun. 20, 2001

(87) PCT Pub. No.: WO01/28952

PCT Pub. Date: Apr. 26, 2001

(30) Foreign Application Priority Data

Oct. 22, 1999 (JP) ............................................. 11-301394
Sep. 14, 2000 (JP) ....................................... 2000-280291

(51) Int. Cl.$^7$ ............................... E06B 3/24; E04C 2/54
(52) U.S. Cl. ....................................... 428/34; 52/786.1
(58) Field of Search .................. 428/34, 409; 52/786.1, 52/786.13

(56) References Cited

U.S. PATENT DOCUMENTS 6,352,758 B1 * 3/2002 Huang et al. ............... 428/143
6,399,688 B1 * 6/2002 Iida ............................ 428/429

FOREIGN PATENT DOCUMENTS

| EP | 593988 A1 | 4/1994 |
| JP | 60-54943 A | 3/1985 |
| JP | 61-197444 A | 9/1986 |
| JP | 5-134397 A | 5/1993 |
| JP | 5-269370 A | 10/1993 |
| JP | 7-42451 A | 2/1995 |
| JP | 53-1212 A | 1/1998 |
| JP | 8-117539 A | 5/1998 |
| JP | 10-152350 A | 6/1998 |
| JP | 10-291842 A | 11/1998 |
| JP | 11-157884 A | 6/1999 |
| JP | 2000-119046 A | 4/2000 |

* cited by examiner

*Primary Examiner*—Donald J. Loney
(74) *Attorney, Agent, or Firm*—Fulbright & Jaworski L.L.P.

(57) ABSTRACT

In order to provide a glass panel in which any substance which may be present on the glass surface and may then become detached to invite deterioration in the vacuum degree has been sufficiently reduced and which can maintain highly sealed condition against the surround atmosphere for an extended period of time, in a glass panel comprising a pair of glass sheet disposed in an opposing and spaced relationship with each other with a gap formed therebetween, the gap being air-tightly sealed by joining peripheral edges of the glass sheets with a sealing material, at least one of the glass sheets has a water contact angle of 30 degrees or less on a gap-side glass surface thereof.

18 Claims, No Drawings

GLASS PANEL AND PRODUCTION METHOD THEREFOR

TECHNICAL FIELD

The present invention relates to a glass panel including a pair of glass sheets spaced apart from each other with a gap formed between opposing faces of the sheets, the gap being sealed with peripheral edges of the glass sheets and being depressurized. The invention relates also to a method of manufacturing such glass panel.

BACKGROUND ART

Such glass panel including a pair of glass sheets with peripheral edges of opposing faces thereof being sealed along the entire periphery and the gap therebetween being depressurized provides a distinguished heat-insulating performance and sound-insulating performance.

As sealing material thereof, it has been a conventional practice to employ low-melting glass containing lead. However, lead is a strongly poisonous metal, and in recent years, there have been concerns about the effects of lead to the human health and environment.

When such sealing material is used, it is necessary that the sealing material be softened sufficiently to be fused to the opposed glass sheets. The fluidizing temperature of the low-melting glass is generally higher than 400° C. Therefore, after the glass sheets are heated from the room temperature to a temperature higher than 400° C., they need to be cooled slowly so as not to cause detachment between the sealing material and the glass sheets, so that the sealing step is very time-consuming. Here, unless indicated otherwise, the "sealing step" in the context of the present invention relates to the step of sealing the entire peripheral edges of the opposing faces of the pair of glass sheets.

The extremely time-consuming sealing step as described above is an economical disadvantage in the manufacture of a glass panel. For this reason, it has been desired to reduce the temperature of the sealing step as well as the time required for the sealing step.

Further, in order to retain the distinguished heat-insulating and sound-insulating performances of the glass panel, it is necessary that the gap be maintained at a high degree of vacuum (preferably, 1.33 Pa or lower), that is, the glass panel have high vacuum stability. For maintaining such high vacuum stability, it is necessary to eliminate sufficiently in advance any substance which may be adsorbed on the glass surfaces on the side of the gap and which may then be gradually detached therefrom after the sealing of the gap, thus inviting deterioration in the vacuum condition.

If the sealing step is effected at the high temperature higher than 400° C., such substance which may be present on the gap-side glass surfaces can be removed and or reduced to a satisfactory degree in the course of this high-temperature sealing step. However, with reduction in the temperature used in the sealing step, the cleaning of the glass surfaces becomes insufficient, and there arises a need for means of decreasing such substance other than the sealing step.

DISCLOSURE OF THE INVENTION

The present invention has been made to solve the above-described problem of the conventional art. Considering the case of effecting the sealing step at a lower temperature from the economical point of view in the manufacture of a glass panel, the invention has been made based on a discovery concerning a relationship between a contact angle of water on the gap-side glass surface forming the glass panel and the vacuum stability of the glass panel and on a further discovery of means to reduce the contact angle.

Namely, according to the present invention, a glass panel comprises a pair of glass sheets disposed in an opposing and spaced relationship with each other with a gap formed therebetween, the gap being air-tightly sealed by joining peripheral edges of the glass sheets with a sealing material, wherein at least one of the glass sheets has a contact angle of 30 degrees or less of water on a gap-side glass surface thereof.

In the above, the concept: "contact angle of water on a glass surface" is commonly employed, in the application of glass for a mirror, automobile or the like, for the purpose of evaluating appearance and visibility of the glass when water is attached to its surface. The concept allows a quantitative evaluation of wettability of water relative to the glass surface. The water contact angle varies depending on the surface condition of glass. It is generally believed that such substance as of silanol group or other functional group present on the glass surface affects this water contact angle through the magnitude of surface energy dependent thereon. The term "contact angle" refers to an angle formed, at a point of intersection between a surface of solid (the glass surface in the case of the present invention) and a surface of droplet (water droplet in the case of the present invention), between a tangential line drawn therefrom to the droplet surface and the solid surface, the angle including the droplet.

In the field of application of a glass panel having a pair of glass sheets having peripheral edges of their opposing faces sealed and a depressurized gap formed between the glass sheets as a window component, the convention has completely failed to refer to or discuss the relationship between the gap-side glass surface condition of the glass panel and the vacuum stability thereof.

For the first time, the present inventors conducted extensive research into the correlation between the vacuum stability and the water contact angle of the gap-side glass surface of the glass panel and have found out a range of contact angle in which the vacuum stability of the glass panel can be maintained.

In this respect, if such depressurized glass panel is to maintain its vacuum stability for an extended period of time, this requires not only that any such substance inviting vacuum degree deterioration be minimized in advance on the glass sheets forming the glass panel, but also that such minimized condition of vacuum-deteriorating substance be maintained on the gap-side glass surfaces of the glass sheets after the manufacture of the glass panel.

Further, in the appended claims, unless indicated otherwise, the term "water contact angle on the glass surface" refers to a value of water contact angle on the gap-side glass surface which value is determined immediately after the finished glass panel has been broken. Namely, the glass panel is air-tightly sealed after being depressurized. Therefore, it is not possible, under this condition, to determine the water contact angle on the gap-side glass surface. However, the value of contact angle determined after the sealing is smaller than that determined before the sealing since the substance present on the gap-side glass surfaces decreases. Further, the value determined immediately after the breakage cannot become smaller than that determined after the sealing, since the interior of the panel becomes exposed to a certain atmosphere upon the breakage. Then, these relations among the water contact angles in the respective cases can be expressed by the following formula.

before depressurization ≥ immediately after breakage ≥ after sealing

In case one of the pair of glass sheets is a glass sheet having non-smooth surface such as a frosted glass sheet, it is not possible to determine the water contact angle on the glass surface as proposed by the invention. However, if it is a glass sheet having vacuum-deteriorating substance minimize, such glass too can be employed for forming the glass panel.

That is, in order for a depressurized glass panel to maintain its degree of vacuum for long time, it is essential that at least one of its glass sheets have a water contact angle less than 30 degrees on its gap-side glass surface. The smaller the contact angle, the better, i.e. the less the amount of such substance as water, organic substance etc. which may be detached from the glass surface to invite deterioration of the vacuum degree of the glass panel. In contrast, if the contact angle exceeds 30 degrees, this means that a large amount of such substance as water, organic substance etc. which may be detached from the glass surface to invite deterioration of the vacuum degree of the glass panel remains, so that the vacuum degree of the glass panel cannot be maintained for long time. It is further preferred that the water contact angle be less than 20 degrees. In this case, the removal of water, organic substance or the like is realized at a still higher degree, so that the vacuum degree can be maintained for even longer time.

Further, if the sealing material employed is a metal material, such metal material is usually bonded to the glass sheet under the molten condition of the metal material. Therefore, in order to avoid deformation of the glass sheets, it is preferred that such metal sealing material have a liquidus temperature $T_L$(° C.) lower than a distortion point $T_S$(° C.) of the glass sheets to be bonded. Here, the "liquidus temperature of metal material" refers to the temperature at which the metal heated from a lower temperature changes completely into a liquid phase. This may be determined by e.g. differential thermal analysis (DTA). With this premise, the bonding can be effected at a temperature range where the deformation of the glass sheet is small. Further, in order to reduce a stress resulting from a thermal expansion difference between the glass sheets and the metal material which difference can lead to breakage, it is preferred that the bonding be effected at low temperature as possible. As a rule of thumb in this respect, $T_L$ should be lower by at least 100° C. than $T_S$.

Further, considering its daily use, the glass panel can be heated to a considerably high temperature when exposed by a very strong sunshine during the summer time. In such case, if $T_L$ is too low, this leads to reduction in strength. For this reason, $T_L$ should be higher than 100° C., more preferably, higher than 150° C.

In summary, the preferred, relationship between the liquidus temperature $T_L$ (° C.) and the distortion point $T_S$(° C.) of the glass sheet to be bonded thereto is: $100 \leq T_L \leq (T_S-100)$, more preferably, $150 \leq T_L \leq (T_S-100)$. Therefore, by selecting the ratios of its respective components, the metal material to be employed should be adjusted to have a liquidus temperature which satisfies the above-described relationship.

Preferably, the metal material contain two or more kinds selected from a group consisting of Sn, Zn, Al, Si and Ti. All these kinds of components can form bonding with oxygen present on the glass sheet surface, thus improving the bonding strength.

In the present invention, it is also possible to employ glass material as the sealing material. Here, the term "glass material" includes not only the glass material per se alone, but also mixture material thereof commonly referred to as "frit" which is a mixture of glass powder and crystal powder mixed therein. When such glass material is employed as the sealing material, the lower the sintering temperature of "frit", the more reduction in the processing temperature is possible. Specifically, it is preferred that the glass-transition temperature (Tg) be lower than 300° C. Since reduction in Tg generally corresponds to reduction in chemical strength of the glass, as a rule of thumb, it is preferred that Tg be greater than 100° C.

Tg content of glass in frit is determined by e.g. the differential thermal analysis (DTA). As the composition of the glass, it is possible to employ the composition conventionally used having a high content of PbO. However, the composition preferably should be PbO free. For example, the preferred composition will be $P_2O_5$—ZnO—$R_2O$ ($R_2O$ is an alkali oxide); $P_2O_5$—ZnO—SnO—$R_2O$; $Bi_2O_3$—ZnO—$B_2O_3$, etc.

Further, preferably, the glass sheet employed in the glass panel of the invention is an air-cooled tempered glass sheet. Such air-cooled tempered glass sheet has a strength about 3 times greater than a non-tempered ordinary glass sheet, thus achieving greater impact resistance and safety.

Also, the sealing material employed in the present invention should have a lead content not exceeding 0.1 wt. %, more preferably, zero wt. %. With this, there occurs no elution of lead when the glass panel is exposed to a severe environment such as exposure to acid rain, giving no adverse effect on the surroundings.

In a further aspect of the present invention, the invention proposes a method of manufacturing a glass panel, which method comprises the steps of: disposing a pair of glass sheets in opposing and spaced relationship with each other with a gap formed therebetween; bonding peripheral edges of the glass sheets with a sealing material so as to seal the gap in an air-tight manner; wherein the method further comprises the step of processing at least one of the pair of glass sheets so that the sheet obtains a water contact angle of 30 degrees or less on a glass surface facing the gap.

The smaller the contact angle, the smaller the amount of any substance such as water, organic substance which may be detached from the glass surface to invite deterioration in the vacuum degree of the glass panel. If the contact angle exceeds 30 degrees, this means that a large amount of such substance as water, organic substance etc. remains which may be detached from the glass surface to invite deterioration of the vacuum degree of the glass panel, so that the vacuum degree of the glass panel cannot be maintained for long time.

It is further preferred that the water contact angle be less than 20 degrees. In this case, the removal of water, organic substance or the like is realized at a still higher degree, so that the vacuum degree can be maintained for even longer time.

Preferably, the processing step is one or more kinds of processing selected from the group consisting of heating, ultraviolet irradiation, plasma processing of the glass sheet. All of these kinds of process are simple process involving mere passage of the glass sheet through a predetermined processing device. Further, the heating may be effected by utilizing an existing equipment provided originally for raising the temperature of the glass sheet such as for its sealing process, thus providing economical advantage.

As for the ultraviolet irradiation and plasma processing, these are effective for reducing the water contact angle on the glass surface without elevating the temperature.

As for the ultraviolet irradiation processing, if a general-purpose type low-pressure mercury-vapor lamp is employed, short-wavelength light of 185, 254 nm, etc. may be employed. In this case, the light will be irradiated on the glass surface which is to be the gap-side surface before the two glass sheets are superposed. It is also conceivable to employ a high-pressure mercury-vapor lamp to irradiate a short-wavelength light of 365, 436 nm, etc. In this case, since such short-wavelength beam transmits through the glass sheets, it is possible to irradiate the beam on the gap-side glass surface after the two glass sheets are superposed.

The plasma processing is another method of cleaning the surface as effectively as or even more effectively than the ultraviolet irradiation. In this method, the glass sheet will be placed in a depressurized vessel. Then, while a gas of Ar or the like is introduced into the vessel, a high DC or AC voltage is applied so as to cause a glow discharge to form plasma, which contacts and treats the glass surface. In recent years, there has been developed a technique capable of producing s similar condition under a normal pressure (atmospheric plasma processing system: "Plasma-Stream", Pearl Industry Co., Ltd., JAPAN). The advantages of this technique are that it makes the reduction of contact angle of glass surface readily possible under the atmospheric pressure condition and also that it gives less adverse effects on the uniformity of the treatment and less damage to the glass surface.

Still preferably, the heating step of the glass sheet is effected to elevate the temperature of the glass sheet to 230° C. or higher, but lower than the softening point of the glass sheet. Here, the "softening point" refers to a point in which in the case of an ordinary glass, its viscosity becomes $10^{7.65}$ dPa·s ($10^{7.65}$ Poise). When heated to this softening point, there occurs rapid fluidization deformation in the glass.

If the temperature of the glass surface is below 230° C., such substance as water, organic substance, etc., is present on the glass surface and this will be detached therefrom with lapse of time, so that such substance inviting deterioration of vacuum degree is not sufficiently reduced, disadvantageously. The upper limit temperature is determined in order to avoid deformation of glass.

This heating process is effective when effected in any step, if it is effected before an exhaust vent of the glass panel is sealed after the panel is evacuated and depressurized through the vent. Normally, this step is realized by simultaneously heating the glass sheets and the sealing material after the sealing material has been set to the glass sheets at the sealing step.

Further, this heating step may be effected separately to the glass sheets and the sealing material, rather than simultaneously thereto. This is also within the spirit of the present invention. For instance, if the sealing step is effected at 200° C., it is preferred that the sealing step for the glass sheet be in a step other than the sealing step. In this case of effecting the heating step and the sealing step separately, it is preferred that the heating step precede the sealing step. In this case, the temperature range of the heating step may be adjusted to any desired temperature between 230° C. and the softening point of the glass described above.

According to a further embodiment of the invention, the invention proposes a method of manufacturing a glass panel, which method comprises the steps of: disposing a pair of glass sheets in opposing and spaced relationship with each other with a gap formed therebetween; bonding peripheral edges of the glass sheets with a sealing material so as to seal the gap in an air-tight manner; wherein during the bond step of the glass sheets, the sealing material is maintained at a temperature higher than 100° C. and below 400° C. Generally, according to the conventional art, the sealing material employed therein has a sintering temperature higher than 400° C., e.g. 450° C. For this reason, the conventional practice was to effect the sealing step at a temperature higher than 450° C.

In the sealing step, it is necessary for the sealing material to be softened sufficiently to be fused to the glass sheets. Thereafter, the sealing material and the glass sheets are to be cooled. In this, this cooling needs to be effected slowly due to the difference in the coefficients of thermal expansion between the sealing material and the glass sheets. Therefore, lower the temperature maintained, the shorter the time required for cooling, thus more economical.

On the other hand, during the bonding step of the glass panel, if the sealing material is to be maintained at a temperature below 100° C., then, it is necessary to employ such sealing material as can be rendered into the fused condition below 100° C. However, considering the daily use of the glass panel, the glass panel may be exposed to a strong sunbeam during summer time, so that the panel will be heated to a considerably high temperature. In such case, needless to say, the sealing material too will be exposed to a considerably high temperature. Therefore, it is not preferred to employ such sealing material as can be fused below 100° C., since this can result in reduction in the strength of the sealing material.

Further, it is more economically advantageous to keep the sealing material at a temperature higher than 100° C. and lower than 250° C. during the bonding step of the glass panel. By setting the retaining temperature of the sealing material lower than 250° C., occurrence of stress relief can be restricted, so that it becomes advantageously possible to employ an air-cooled tempered glass sheet as the glass sheet.

In the case of effecting the bonding step at the temperature range of 100° C. to 250° C., and effected at a relatively low temperature range of 100° C. to 220° C., if the ultraviolet irradiation processing or plasma processing described hereinbefore is also effected, both sealing and cleaning of the glass surface can be realized at one time. As a result, the water contact angle may be set to the target range of the present invention.

The composition of the glass sheets to be employed in the present invention is not particularly limited. It can be any one of soda-lime silica glass commonly employed in a windowpane, borosilicate glass, aluminosilicate glass, crystallized glass, etc. Further, the type of manufacture method of the glass sheet is not particularly limited, either. It can be float glass process, roll-out process, down-draw process, press process, etc. Moreover, for the purpose of improvement of e.g. optical property, thermal property thereof, an oxide coating film, metal coating film, etc. may be on the surface of the glass sheet.

For example, in recent years, a low-radiation glass having superior heat-insulating performance is preferred from the view point of energy conservation. Then, at least one of the pair of glass sheets forming the glass panel of the invention may be such low-radiation glass. One specific example of this low-radiation glass is a glass provided with a coating comprised mainly of stannic oxide by means of such method of CVD (Chemical Vapor Deposition) during the manufacturing line of the glass sheet. Further alternatively, it may also be a low-radiation glass having a basic construction in which a pair of dielectric layers vertically stacked on a silver layer therebetween by means of sputtering method or the like within a vacuum vessel. When these types of glass are employed in the glass panel of the invention, the coated face may be present on the gap-side without departing from the spirit of the present invention. In such case, the water contact angle of the coating film corresponds to the vacuum stability of the glass panel.

Further, the glass sheets employed in the present invention are not limited to one glass sheet and the other glass sheet having an identical length, width, etc. It is also possible to employ glass sheets having different sizes from each other. And, the manner of superposing the two glass sheet is not limited to the superposed condition of the two glass sheets having peripheral edges thereof completely aligned with each other. It is also possible for the peripheral edge of one glass sheet to project beyond that of the other. Further alternatively, the glass panel may be a combination of two glass sheets being different in thickness thereof from each other.

BEST MODE OF EMBODYING THE INVENTION

Embodiments of the present invention will be described next, with reference to specific examples.

EXAMPLES 1–6

For each Example, a float glass sheet having 3mm thickness was cut into a sheet of 300 mm×300 mm square and a further sheet of 290 mm×290 mm square, respectively. In the 290 mm square glass sheet, a vent of 2.0 mm diameter was bored at the center thereof. Then, these two glass sheets were washed and dried.

Then, the 300 mm square glass sheet was placed, on which a plurality of spaces each having 0.2 mm height and 0.5 mm diameter were disposed with 20 mm spacing on the upper face of the glass sheet. Then, on this, the 290 mm square glass sheet defining the vent was placed with the centers of the two glass sheets being aligned with each other. Then, these glass sheets were set inside a heating furnace and maintained for 30 minutes at each temperature shown in Table 1 below, thus a heating step was effected.

TABLE 1

|  | Ex. 1 | Ex. 2 | Ex. 3 | Ex. 4 | Ex. 5 | Ex. 6 |
| --- | --- | --- | --- | --- | --- | --- |
| retaining temperature (° C.) | 230 | 260 | 300 | 330 | 400 | 500 |
| contact angle (degrees) | 29 | 18 | 12 | 10 | 6 | 4 |
| vacuum stability | ○ | ○ | ○ | ○ | ○ | ○ |

For the glass sheets with each heating process, the water contact angle on the gap-side glass surface was determined. This determination of contact angle was effected immediately after the temperature of the glass sheet dropped. Until the temperature dropped, it was kept within a clean container separated from the outside, in order to avoid re-adhesion of water or organic substance. The columns of "contact angle" in Table 1 show the determined water contact angles on the glass surfaces with the respective heating processes.

Further, each set of glass sheets having undergone the respective heating process shown in Table 1 above was placed on a graphite plate on a heated plate heated to 150° C. Under this condition, solder, which is a lead-free metal material having a composition of Sn 90.5%, Zn 9.0%, Ti 0.15%, Cu 0.35%, was fused by means of an ultrasonic soldering iron having a tip vibrated at frequency of 60 kHz and applied into the gap between the two glass sheets along and over the entire peripheral edges of the mutually facing surfaces of the glass sheets. With this, a glass panel having a peripheral edge sealed with the solder was obtained.

Then, this glass panel was evacuated and its evacuating vent was sealed in the same manner as the peripheral edge described above. Immediately after sealing thereof, a heat transmission coefficient of each glass panel was determined as 2.5 (W/mW$^2$K (2.2 (kcal/hm$^{2°}$ C.). Thus, a glass panel having extremely high heat-insulating performance was obtained. Thereafter, the sample was left for one week and then its heat transmission coefficient was determined again as an evaluation of vacuum stability. In the column of "vacuum stability" in Table 1 above, the mark "○" indicates good maintenance of the heat transmission coefficient, a mark "X" means occurrence of rise in the heat transmission coefficient.

As may be apparent from Table 1, for each of the glass panels with the heating processes of Examples 1–6, no rise from the heat transmission coefficient as determined immediately after the sealing was observed even with lapse of time, so that good maintenance of its vacuum stability was confirmed.

Further, for each of samples prepared in the same manner as Examples 1–6, its sound-insulating performance (value of sound transmission loss) according to JIS A1416 was determined. Then, all of the samples of Examples 1–6 exhibited higher sound-insulating performance over the entire frequency range (125 to 4000 Hz) than the Ts-30 grade line which is the grade line defined by the JIS A4706.

Then, the samples of Examples 1–6 were destroyed and then immediately thereafter, the contact angle of the gap-side glass surface of each sample was determined. With these, substantially same values as shown in Table 1 above were obtained, hence, good maintenance of the predetermined contact angle was confirmed. Further, after the destruction, each sample was left in a room at a room temperature of 25° C. and a humidity of 60%. But, no rise in the contact angle was observed for one day.

Therefore, this embodiment is equivalent to a method effecting the heating step between 230° C. and 500° C. and then effecting the sealing st ep below 400° C.(and also lower than 230° C.).

EXAMPLES 7–10

For each Example, a low-radiation glass comprising a float glass sheet having 3 mm thickness hand having a stannic oxide coating film formed on one face thereof was cut into a sheet of 300 mm×300 mm square and a further sheet of 290 mm×290 mm square, respectively. In the 290 mm square glass sheet, a vent of 2.0 mm diameter was bored at the center thereof Then, these two glass sheets were washed and dried.

Then, the 300 mm square low-radiation glass sheet was placed with the coated face being oriented upward, on which a plurality of spaces each having 0.2 mm height and 0.5 mm diameter were disposed with 20 mm spacing on the upper face of the glass sheet. Then, on this, the 290 mm square low-radiation glass sheet defining the vent was placed, with the coated face thereof oriented downward, with the centers of the two glass sheets being aligned with each other. Then, these glass sheets were set inside a heating furnace and maintained for 30 minutes at each temperature shown in Table 2 below, thus a heating step was effected.

TABLE 2

|  | Ex. 7 | Ex. 8 | Ex. 9 | Ex. 10 |
|---|---|---|---|---|
| retaining temperature (° C.) | 300 | 320 | 400 | 500 |
| contact angle (degrees) | 18 | 12 | 8 | 5 |
| vacuum stability | ○ | ○ | ○ | ○ |

For the glass sheets with each heating process, the water contact angle on the gap-side glass surface was determined. This determination of contact angle was effected immediately after the temperature of the glass sheet dropped. Until the temperature dropped, it was kept within a clean container separated from the outside, in order to avoid re-adhesion of water or organic substance. The columns of "contact angle" in Table 2 show the determined water contact angles on the glass surfaces with the respective heating processes.

Further, each set of glass sheets having undergone the respective heating process shown in Table 2 above was placed on a graphite plate on a heated plate heated to 150° C. Under this condition, solder, which is a lead-free metal material having a composition of Sn 90.5%, Zn 9.0%, Ti 0.15%, Cu 0.35%, was fused by means of an ultrasonic soldering iron having a tip vibrated at frequency of 60 kHz and applied into the gap between the two glass sheets along and over the entire peripheral edges of the mutually facing surfaces of the glass sheets. With this, a glass panel having a peripheral edge sealed with the solder was obtained.

Then, this glass panel was evacuated and its evacuating vent was sealed in the same manner as the peripheral edge described above. Immediately after sealing thereof, a heat transmission coefficient of each glass panel was determined as 1.3 (W/m$^2$K) (1.1 (kcal/hm$^{2\circ}$ C.). Thus, a glass panel having extremely high heat-insulating performance was obtained. Thereafter, the sample was left for one week and then its heat transmission coefficient was determined again as an evaluation of vacuum stability. In the column of "vacuum stability" in Table 2 above, the mark "○" indicates good maintenance of the heat transmission coefficient, a mark "X" means occurrence of rise in the heat transmission coefficient.

As may be apparent from Table 2, for each of the glass panels with the heating processes of Examples 7–10, no rise from the heat transmission coefficient as determined immediately after the sealing was observed even with lapse of time, so that good maintenance of its vacuum stability was confirmed.

Further, for each of samples prepared in the same manner as Examples 7–10, its sound-insulating performance (value of sound transmission loss) according to JIS A1416 was determined. Then, all of the samples of Examples 7–10 exhibited higher sound-insulating performance over the entire frequency range (125 to 4000 Hz) than the Ts-30 grade line which is the grade line defined by the JIS A4706.

Then, the samples of Examples 7–10 were destroyed and then immediately thereafter, the contact angle of the gap-side glass surface of each sample was determined. With these, substantially same values as shown in Table 2 above were obtained, hence, good maintenance of the predetermined contact angle was confirmed. Further, after the destruction, each sample was left in a room at a room temperature of 25° C. and a humidity of 60%. But, no rise in the contact angle was observed for one day.

Therefore, this embodiment is equivalent to a method effecting the heating step between 300° C. and 500° C. and then effecting the sealing st ep below 400° C.(and also lower than 230° C.).

COMPARISON EXAMPLES 1, 2

Except that the heating process of the glass sheets inside the heating furnace were effected this time at the retaining temperatures shown in Table 3 below, in the same manner as Examples 1–6, the determination of the water contact angle on the gap-side glass surface of the glass sheets and the production of the glass panel having peripheral edge sealed with solder were effected. The glass panel of each example evacuated and its evacuating vent was sealed in the same manner as the peripheral edge described above. Immediately after sealing thereof, a heat transmission coefficient of each glass panel was determined as 2.5 (W/m$^2$K) (2.2 kcal/hm$^{2\circ}$ C.). Thus, a glass panel having extremely high heat-insulating performance was obtained. Thereafter, the sample was left for one week and then its heat transmission coefficient was determined again as an evaluation of vacuum stability. In the column of "vacuum stability" in Table 3 below, the mark "○" indicates good maintenance of the heat transmission coefficient, a mark "X" means occurrence of rise in the heat transmission coefficient.

As may be apparent from Table 3, for each of the glass panels with the heating processes of Comparison Examples 1, 2, there was observed gradual rise in the heat transmission coefficient with lapse of time, so that its vacuum degree was not maintained.

Further, for each of samples prepared in the same manner as Comparison Examples 1, 2, its sound-insulating performance (value of sound transmission loss) according to JIS A1416 was determined. Then, neither of the samples of Comparison Examples 1, 2 exhibited lower sound-insulating performance over the entire frequency range (125 to 4000 Hz) than the Ts-30 grade line which is the grade line defined by the JIS A4706. Hence, the sound-insulating performances of these samples were found to be inferior to those of Examples 1–10.

Then, the samples of Comparison Examples 1, 2 were destroyed and then immediately thereafter, the contact angle of the gap-side glass surface of each sample was determined. With these, substantially same values as shown in Table 3 below were obtained, hence. As may be apparent from Table 3, for the samples of Comparison Examples 1, 2, the water contact angles on the tap-side glass surfaces immediately after the breakage thereof were greater than 30 degrees. Thus, it was confirmed that the vacuum degrees of these were not maintained.

TABLE 3

|  | Com. Ex. 1 | Com. Ex. 2 |
|---|---|---|
| retaining temperature (° C.) | 150 | 180 |
| contact angle (degrees) | 45 | 56 |
| vacuum stability | X | X |

As described above, according to the glass panel and its manufacturing method proposed by the present invention, the glass sheet forming the glass panel can maintain such condition in which the amount of substance which can become detached after sealing of the gap to invite deterioration in the vacuum degree has been sufficiently reduced in advance; and the gap is sealed in air-tight manner by bonding the peripheral edges of the two glass sheets with the sealing material. Then, it is possible to maintain the highly sealed condition against the surrounding atmosphere for an extended period of time, and the glass panel can maintain its superior heat-insulating and sound-insulating performances.

INDUSTRIAL FIELD OF APPLICATION

According to the present invention, by using the invention's method of manufacturing a glass panel, it is possible to obtain a glass panel including a pair of glass sheets spaced apart from each other with a gap formed between opposing faces of the sheets, the gap being sealed with peripheral edges of the glass sheets and being depressurized.

The glass panel and its manufacturing method of the present invention find their applications in the field of building construction, vehicles (window pane of automobile, railway train or of a boat), various instruments (display panel of a plasma display device, a door or wall of a refrigerator or heat-insulating device), etc.

What is claimed is:

1. A glass panel comprising:
a pair of glass sheets disposed in an opposing and spaced relationship with each other with a gap formed therebetween, the gap being evacuated and sealed by joining peripheral edges of the glass sheets with a sealing material, wherein at least one of the glass sheets has a water contact angle of 30 degrees or less on a gap-side glass surface thereof.

2. A glass panel according to claim 1, wherein at least one of the glass sheets has a water contact angle of 20 degrees or less on a gap-side glass surface of the glass sheet.

3. A glass panel according to claim 1, wherein the sealing material has a lead content below 0.1 wt. %.

4. A glass panel according to claim 2, wherein the sealing material has a lead content below 0.1 wt. %.

5. A glass panel according to claim 1, wherein the sealing material is a metal material.

6. A glass panel according to claim 2, wherein the sealing material is a metal material.

7. A glass panel according to claim 3, wherein the sealing material is a metal material.

8. A glass panel according to claim 1, wherein the glass panel satisfies the condition: $100 \leq T_L \leq (T_S-100)$, where $T_L$ (° C.) is the liquidus temperature of the metal material and $T_S$ (° C.) is the distortion point of the glass sheet.

9. A glass panel according to claim 2, wherein the glass panel satisfies the condition: $100 \leq T_L \leq (T_S-100)$, where $T_L$ (° C.) is the liquidus temperature of the metal material and $T_S$ (° C.) is the distortion point of the glass sheet.

10. A glass panel according to claim 3, wherein the glass panel satisfies the condition: $100 \leq T_L \leq (T_S-100)$, where $T_L$ (° C.) is the liquidus temperature of the metal material and $T_S$ (° C.) is the distortion point of the glass sheet.

11. A glass panel according to claim 5, wherein the glass panel satisfies the condition: $100 \leq T_L \leq (T_S-100)$, where $T_L$ (° C.) is the liquidus temperature of the metal material and $T_S$ (° C.) is the distortion point of the glass sheet.

12. A glass panel according to claim 1, wherein the metal material contains two or more kinds selected from a group consisting of Sn, Zn, Al, Si and Ti.

13. A glass panel according to claim 2, wherein the metal material contains two or more kinds selected from a group consisting of Sn, Zn, Al, Si and Ti.

14. A glass panel according to claim 1, wherein the sealing material is a glass material.

15. A glass panel according to claim 2, wherein the sealing material is a glass material.

16. A glass panel according to claim 1, wherein the panel satisfies the condition: $100 \leq Tg \leq 300$, where Tg (° C.) is the glass-transition temperature of the glass material.

17. A glass panel according to claim 14, wherein the panel satisfies the condition: $100 \leq Tg \leq 300$, where Tg (° C.) is the glass-transition temperature of the glass material.

18. A glass panel according to claim 1, wherein at least one of the glass sheets is an air-cooled tempered glass sheet.

* * * * *